(12) United States Patent
Kurimura et al.

(10) Patent No.: US 9,242,442 B2
(45) Date of Patent: Jan. 26, 2016

(54) METHOD OF MANUFACTURING TRANSLUCENT RIGID SUBSTRATE LAMINATE AND TRANSLUCENT RIGID SUBSTRATE BONDING APPARATUS

(75) Inventors: Hiroyuki Kurimura, Shibukawa (JP); Hayato Miyazaki, Shibukawa (JP); Gosuke Nakajima, Shibukawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 13/574,510

(22) PCT Filed: Jan. 13, 2011

(86) PCT No.: PCT/JP2011/050464
§ 371 (c)(1),
(2), (4) Date: Jul. 20, 2012

(87) PCT Pub. No.: WO2011/089964
PCT Pub. Date: Jul. 28, 2011

(65) Prior Publication Data
US 2013/0037204 A1    Feb. 14, 2013

(30) Foreign Application Priority Data

Jan. 21, 2010   (JP) .................................. 2010-011156
Jan. 21, 2010   (JP) .................................. 2010-011162

(51) Int. Cl.
*B32B 37/02* (2006.01)
*B32B 37/12* (2006.01)
(Continued)

(52) U.S. Cl.
CPC ........... *B32B 37/12* (2013.01); *B32B 17/10045* (2013.01); *B32B 17/10706* (2013.01);
(Continued)

(58) Field of Classification Search
CPC .. B32B 37/12; B32B 38/1858; B32B 43/006; B32B 17/10045; B32B 17/10706; B32B 17/10908

USPC .................. 156/99, 221, 273.3, 275.5, 273.5, 156/272.2, 379.6, 380.9, 701, 703, 704, 711
See application file for complete search history.

(56) References Cited

U.S. PATENT DOCUMENTS 5,380,387 A * 1/1995 Salamon et al. ............... 156/154
5,624,521 A * 4/1997 Hed ........................... 156/275.7
(Continued)

FOREIGN PATENT DOCUMENTS

JP          60-199646       10/1985
JP          02-22150        1/1990
(Continued)

OTHER PUBLICATIONS

International Search Report, mailed Apr. 19, 2011, issued in corresponding International Application No. PCT/JP2011/050461.
(Continued)

*Primary Examiner* — Daniel McNally
(74) *Attorney, Agent, or Firm* — Stein IP, LLC

(57) ABSTRACT

Provided is a method of manufacturing a translucent rigid substrate laminate to improve a positional precision. Further, a translucent rigid substrate bonding apparatus contributing to improvement of the positional precision while increasing production efficiency of a plate-shaped product is provided. In the method of manufacturing the translucent rigid substrate laminate and the translucent rigid substrate bonding apparatus according to the present invention, when translucent rigid substrates are bonded in a predetermined positional relationship by interposing a photo-curable fixing agent therebetween, the entire fixing agent interposed and spreading between both translucent rigid substrates is cured everytime the translucent rigid substrates are bonded.

16 Claims, 7 Drawing Sheets

(51) Int. Cl.
- *B32B 38/18* (2006.01)
- *B32B 43/00* (2006.01)
- *B32B 17/10* (2006.01)
- B32B 38/00 (2006.01)
- B32B 37/24 (2006.01)
- G02F 1/13 (2006.01)
- G02F 1/1333 (2006.01)

(52) U.S. Cl.
CPC ....... *B32B17/10908* (2013.01); *B32B 38/1858* (2013.01); *B32B 43/006* (2013.01); *B32B 37/1284* (2013.01); *B32B 38/0004* (2013.01); *B32B 2037/1253* (2013.01); *B32B 2037/243* (2013.01); *B32B 2038/1891* (2013.01); *B32B 2307/414* (2013.01); *B32B 2309/04* (2013.01); *B32B 2309/12* (2013.01); *B32B 2310/0831* (2013.01); *B32B 2457/20* (2013.01); *G02F 1/1303* (2013.01); *G02F 2001/133331* (2013.01); *G02F 2201/50* (2013.01); *Y10T 156/1043* (2015.01)

(56) References Cited

U.S. PATENT DOCUMENTS

| | | | |
|---|---|---|---|
| 6,004,413 A * | 12/1999 | Couttenier | 156/99 |
| 6,228,203 B1 | 5/2001 | Kotoyori et al. | 156/291 |
| 6,309,485 B1 * | 10/2001 | Miyamoto et al. | 156/64 |
| 6,475,292 B1 * | 11/2002 | Sahbari | 134/3 |
| 6,627,309 B2 * | 9/2003 | Stebbings et al. | 428/352 |
| 6,740,190 B2 * | 5/2004 | Takase | 156/267 |
| 2001/0046644 A1 * | 11/2001 | Ukachi et al. | 430/281.1 |
| 2002/0062787 A1 * | 5/2002 | Hashizume et al. | 118/664 |
| 2003/0205333 A1 * | 11/2003 | Hayafuji et al. | 156/580 |
| 2004/0094264 A1 * | 5/2004 | Yamaguchi et al. | 156/273.3 |
| 2009/0218034 A1 | 9/2009 | Kawabe | |
| 2012/0298285 A1 * | 11/2012 | Kurimuru et al. | 156/64 |
| 2013/0081752 A1 * | 4/2013 | Kurimura et al. | 156/64 |

FOREIGN PATENT DOCUMENTS

| | | | |
|---|---|---|---|
| JP | 11-271782 | | 10/1999 |
| JP | 11271782 A | * | 10/1999 |
| JP | 2000-44292 | | 2/2000 |
| JP | 2000-319043 | | 11/2000 |
| JP | 2001-192246 | | 7/2001 |
| JP | 2002-522340 | | 7/2002 |
| JP | 2003-270606 | | 9/2003 |
| JP | 2005-132692 | | 5/2005 |
| JP | 2009-1478 | | 1/2009 |
| JP | 2009-40617 | | 2/2009 |
| JP | 2009-205065 | | 9/2009 |
| JP | 2009-256125 | | 11/2009 |
| JP | 2009256125 A | * | 11/2009 |

OTHER PUBLICATIONS

International Preliminary Report on Patentability dated Aug. 7, 2012, issued in corresponding International Patent Application No. PCT/JP2011/050461.

English translation of the claims of Japanese Patent Application Publication No. JP 60-199646, which was cited in the International Search Report mailed Mar. 22, 2011, issued in International Patent Application No. PCT/JP2011/050464.

U.S. Appl. No. 13/554,747, filed Jul. 20, 2012, Hiroyuki Kurimura et al., Denki Kagaku Kogyo Kabushiki Kaisha.

International Search Report; Application No. PCT/JP2011/050464; Form PCT/ISA/210 (6 pages).

International Preliminary Report on Patentability dated Aug. 7, 2012, issued in corresponding International Patent Application No. PCT/JP2011/050464.

PCT/IB/338 for PCT/JP2011/062619; mailed Jan. 24, 2013; 1 page.
PCT/IB/337 for PCT/JP2011/062619; mailed Jan. 15, 2013; 1 page.
International Search Report for PCT/JP2011/062619, Mailing Date: Jul. 5, 2011.

U.S. Appl. No. 13/554,747, filed Jul. 20, 2012, Hiroyuki Kurimura, Denki Kagaku Kogyo Kabushiki Kaisha.

U.S. Appl. No. 13/703,858, filed Dec. 12, 2012, Hiroyuki Kurimura, Denki Kagaku Kogyo Kabushiki Kaisha.

* cited by examiner

METHOD OF MANUFACTURING TRANSLUCENT RIGID SUBSTRATE LAMINATE AND TRANSLUCENT RIGID SUBSTRATE BONDING APPARATUS

CROSS-REFERENCE TO RELATED APPLICATIONS

This application is a National Stage of PCT International Patent Application No. PCT/JP2011/050464, filed Jan. 13, 2011, and Japanese Patent Application No. 2010-011156, filed Jan. 21, 2010, and Japanese Patent Application No. 2010-011162, filed Jan. 21, 2010, in the Japanese Intellectual Property Office, the disclosures of which are incorporated herein by reference.

BACKGROUND OF THE INVENTION

1. Field of the Invention

The present invention relates to a method of manufacturing a translucent rigid substrate laminate and a translucent rigid substrate bonding apparatus, and particularly to a method of manufacturing a plate glass laminate for manufacturing a protection glass of a display element and a plate glass bonding apparatus used in a process of manufacturing the protection glass of the display element.

2. Description of the Related Art

Display elements such as liquid crystal displays (LCDs), organic EL displays (OELDs), electroluminescent displays (ELDs), field emission displays (FEDs), and plasma displays (PDPs) are used in display devices of various kinds of electronic equipment such as televisions, laptop computers, car navigations, electronic calculators, mobile phones, electronic schedulers and personal digital assistants (PDAs). Further, a plate glass product for protection is generally installed to face the display element in order to protect the display element.

The plate glass product is processed in proper size and shape so that the plate glass corresponds to each display device, but it is required that a large amount of plate glass products are processed at high production efficiency in order to cope with a cost level required in the market.

Accordingly, Japanese Patent Application Laid-Open No. 2009-256125 (Patent Literature 1) proposes a method of increasing production efficiency of a plate glass product. Specifically, Japanese Patent Application Laid-Open No. 2009-256125 proposes "a method of processing a plate glass, comprising: forming a material glass block (A) obtained by laminating a plurality of material plate glasses 1 and, at the same time, integrally fixing each material plate glass 1 by a strippable fixing material 2 interposed between the material plate glasses 1, forming a division glass block (B) having a small area by dividing the material glass block (A) in a surface direction, forming a product glass block (C) in a product form when viewed in a plan view by processing at least an outer boundary of the division glass block (B), and individually separating the product glass block (C) after an edge face of the product glass block (C) is processed" (claim 1). Accordingly, there is described that "since division, external shape processing and edge face processing are performed while a plurality of material plate glasses are laminated, a plurality of plate glass products may be obtained by a few processes and productivity is high" (paragraph 0007).

Further, Japanese Patent Application Laid-Open No. 2009-256125 describes that "the fixing material 2 interposed between the material plate glasses 1 is a photo-curable liquid fixing material that is cured when UV is irradiated and then softened when a temperature is increased (claim 4). Accordingly, there is described that "if pressure is applied in upper and lower directions by interposing the photo-curable liquid fixing agent between the upper and lower material plate glasses, the liquid fixing agent spreads to have a constant thickness in a film form on the entire surface between the upper and lower material plate glasses, and if infrared rays are irradiated in this state, the liquid fixing agent spreading in the film form is cured to integrally fix the upper and lower plate glasses. Therefore, a plurality of material plate glasses may be rapidly laminated with a high precision so as to be integrally fixed. In addition, after final processing (edge face processing), if the product glass block is immersed in warm water and the like to increase the temperature, the fixing agent cured between the plate glasses is softened and separated in a film form. It is described that therefore, it is easy to recover and treat the fixing agent without causing environmental pollution (paragraph 0007).

The column of "Best Embodiments for Carrying Out the Invention" of Japanese Patent Application Laid-Open No. 2009-256125 describes that twenty material plate glasses are laminated while the photo-curable liquid fixing agent is interposed between the material plate glasses, subsequently, the fixing agent is cured by irradiating UV (UV ray) to the upper surface of the laminated material plate glass, and the material glass block where the upper and lower material plate glasses are integrally fixed is formed (paragraphs 0010 to 0011).

PRIOR ART

Patent literature

Patent literature 1: Japanese Patent Application Laid-Open No. 2009-256125

SUMMARY OF THE INVENTION

Additional aspects and/or advantages of the invention will be set forth in part in the description which follows and, in part, will be obvious from the description, or may be learned by practice of the invention.

According to a method of processing a plate glass described in Japanese Patent Application Laid-Open No. 2009-256125, it is possible to manufacture a plate glass product having a given shape with high production efficiency. However, some of electronic equipment require that a desired printing pattern (for example, a design of a display screen of a mobile phone) is formed on a plate glass, and in this case, a high positional precision with respect to the pattern to be printed is required (for example, an allowable error is about 10 to 30 μm).

In the method described in Japanese Patent Application Laid-Open No. 2009-256125, twenty material plate glasses are laminated while the photo-curable liquid fixing agent is interposed between the material plate glasses, subsequently, the fixing agent is cured by irradiating UV (UV ray) to the upper surface of the laminated material plate glass, and the material glass block where the upper and lower material plate glasses are integrally fixed is formed. However, since the fixing agent is not cured while the material plate glass is laminated and slight misalignment easily occurs between the glass surfaces, said procedure is not suitable for alignment with a high precision. That is, it is difficult to obtain high positional precision in the method described in Japanese Patent Application Laid-Open No. 2009-256125.

Means for Solving the Problem

Further, Japanese Patent Application Laid-Open No. 2009-256125 discloses the invention of the method of bonding glasses but does not describe an apparatus for implementing the same. It is preferable that an apparatus for bonding glasses be provided in order to perform industrial mass-production.

Therefore, it is an object of the present invention to provide a method of manufacturing a translucent rigid substrate laminate to improve a positional precision. It is another object of the present invention to provide a method of manufacturing a plate-shaped product by using the method of manufacturing the translucent rigid substrate laminate. It is yet another object of the present invention to provide a translucent rigid substrate bonding apparatus contributing to improvement of the positional precision while increasing production efficiency of the plate-shaped product.

The present inventors have intensively studied to solve the aforementioned problems, and found that, when translucent rigid substrates are bonded in a targeted positional relationship by interposing a photo-curable fixing agent therebetween, it is effective to cure the entire fixing agent which is interposed and spreads between both translucent rigid substrates everytime the translucent rigid substrates are bonded. Since the translucent rigid substrates are strongly adhered by curing the fixing agent everytime the translucent rigid substrates are bonded, there is no need to worry about the misalignment even though the number of laminates is increased.

Further, the present inventors found that it is possible to efficiently increase the number of the substrates constituting the translucent rigid substrate laminate by adopting a constitution in which a translucent rigid substrate laminate after bonding is held at an upper part, a translucent rigid substrate to be subsequently laminated is provided from a lower side, and light is irradiated toward the translucent rigid substrate of the lower side from below.

In an aspect of the present invention accomplished based on the aforementioned view, a method of manufacturing a translucent rigid substrate laminate includes: 1) a process of preparing a first translucent rigid substrate, 2) a process of preparing a second translucent rigid substrate, 3) a process of applying a photo-curable fixing agent to a first surface of the first translucent rigid substrate and/or a first surface of the second translucent rigid substrate, 4) a process of allowing the first surface of the first translucent rigid substrate and the first surface of the second translucent rigid substrate to face each other so that both surfaces are parallel to each other under a predetermined positional relationship in a surface direction, 5) a process of applying a given pressure to the first surface of the first translucent rigid substrate and the first surface of the second translucent rigid substrate while maintaining the positional relationship, and bonding both translucent rigid substrates, 6) a process of irradiating light for curing the entire fixing agent interposed and spreading between both translucent rigid substrates while applying the given pressure to form the translucent rigid substrate laminate, and 7) a process of repeating processes 1) to 6) at least one time by regarding the translucent rigid substrate laminate as the first translucent rigid substrate to form the translucent rigid substrate laminate where at least three translucent rigid substrates are bonded.

In an embodiment of the method of manufacturing the translucent rigid substrate laminate according to the present invention, process 6) is performed by irradiating light to the surface of the second translucent rigid substrate.

The embodiment of the method of manufacturing the translucent rigid substrate laminate according to the present invention may further include 5') a process of forming the provisionally fastened translucent rigid substrate laminate by irradiating light having energy that is lower than energy of process 6) on the entire fixing agent or a portion of the fixing agent interposed and spreading between both translucent rigid substrates between processes 5) and 6).

In another embodiment of the method of manufacturing the translucent rigid substrate laminate according to the present invention, a mark for alignment is attached to the surface of each translucent rigid substrate, and process 4) includes performing position adjustment while imaging the mark by an imaging device.

In another embodiment of the method of manufacturing the translucent rigid substrate laminate according to the present invention, a given printing pattern and/or plating pattern for exhibiting any one of the functions of a plate-shaped product is attached to the surface of each translucent rigid substrate.

In yet another embodiment of the method of manufacturing the translucent rigid substrate laminate according to the present invention, the fixing agent includes a granular material.

In yet another embodiment of the method of manufacturing the translucent rigid substrate laminate according to the present invention, the amount of irradiation of light is in the range of 30 to 4,000 mJ/cm2 when measured by a cumulative illuminometer using a light receptor of 365 nm.

In yet another embodiment of the method of manufacturing the translucent rigid substrate laminate according to the present invention, the translucent rigid substrate is a plate glass.

In another aspect of the present invention, a method of manufacturing a plate-shaped product includes: 8) a process of dividing the translucent rigid substrate laminate obtained by using the method of manufacturing the translucent rigid substrate laminate in a thickness direction to form a desired number of the divided translucent rigid substrate laminates, 9) a process of performing desired shape processing with respect to each of the divided translucent rigid substrate laminates, and 10) a process of heating the translucent rigid substrate laminate after the shape processing to delaminate the bonded translucent rigid substrates from each other and forming a plurality of plate-shaped products.

An embodiment of the method of manufacturing the plate-shaped product according to the present invention further includes a process of bringing the divided translucent rigid substrate laminates into contact with a delaminating agent under temperature and time conditions required to reduce adhesion strength of an exposed portion of an edge of an external side of a fixing agent interposed between the translucent rigid substrates between processes 8) and 9).

In another embodiment of the method of manufacturing the plate-shaped product according to the present invention, the delaminating agent includes one kind or two kinds or more selected from a solvent, an oxidizing agent and a surfactant.

In yet another embodiment of the method of manufacturing the plate-shaped product according to the present invention, the delaminating agent includes one kind or two kinds or more selected from water, alcohols, an oxidizing agent and a surfactant.

In yet another embodiment of the method of manufacturing the plate-shaped product according to the present invention, the delaminating agent includes the water, the alcohols and the surfactant in a mass ratio of 30 to 50:30 to 50:5 to 20.

In yet another embodiment of the method of manufacturing the plate-shaped product according to the present invention, the delaminating agent includes benzyl alcohol.

In yet another embodiment of the method of manufacturing the plate-shaped product according to the present invention, the delaminating agent includes an anionic surfactant.

In yet another embodiment of the method of manufacturing the plate-shaped product according to the present invention, the delaminating agent includes a sulfonic acid type surfactant.

In yet another embodiment of the method of manufacturing the plate-shaped product according to the present invention, a liquid temperature of the delaminating agent is 20 to 40° C. and a contact time to the delaminating agent is 1 to 20 min.

In yet another aspect of the present invention, a translucent rigid substrate bonding apparatus includes: an upper stage having an absorption hole for vacuum adsorption of a translucent rigid substrate of an upper side to hold the translucent rigid substrate of the upper side, a press unit for moving the upper stage in a Z-axis direction, an absorption unit for providing absorption force to the absorption hole, a lower stage for holding a translucent rigid substrate of a lower side, a means for moving the lower stage in an X-axis direction, a Y-axis direction and a θ-axis direction, a means for applying a photo-curable fixing agent to any one side or both sides of a lower surface of the translucent rigid substrate of the upper side and an upper surface of the translucent rigid substrate of the lower side, and a light irradiation component for irradiating light to an entire surface of the translucent rigid substrate of the lower side from below.

An embodiment of the translucent rigid substrate bonding apparatus according to the present invention further includes an imaging unit for imaging an alignment mark provided on the surfaces of the translucent rigid substrates of the upper side and the lower side, an image processing unit for detecting the degree of misalignment of the alignment mark provided on the surfaces of the upper side and the lower side based on an imaging result, and a control unit for controlling the means for moving the lower stage based on the detected degree of misalignment.

The substrates may be laminated with a higher positional precision by finely adjusting the positional relationship between the translucent rigid substrates by using the imaging unit. Accordingly, in the case where the printing pattern or the plating pattern is attached to the surface of the translucent rigid substrate, it is possible to deal with the case where the high positional precision is required.

In another embodiment of the translucent rigid substrate bonding apparatus according to the present invention, the translucent rigid substrate held on the upper stage and/or the lower stage is a laminate of two or more translucent rigid substrates.

Three or more substrate laminates may be manufactured by serving a laminate formed of two or more translucent rigid substrates as the translucent rigid substrate of the upper side and/or lower side bonded in the present invention.

In yet another embodiment of the translucent rigid substrate bonding apparatus according to the present invention, the means for applying the fixing agent applies the fixing agent including a granular material.

Since the fixing agent may include the granular material to make the thickness of the fixing agent constant, the processing precision is improved. Further, a delaminating property is improved in subsequent delaminating by a difference in line expansion coefficient of the fixing agent component and the granular material.

In yet another embodiment of the translucent rigid substrate bonding apparatus according to the present invention, the translucent rigid substrate is a plate glass.

According to the present invention, it is possible to manufacture a translucent rigid substrate laminate with a high positional precision. Therefore, it is possible to industrially manufacture a plate-shaped product with high dimensional precision. The present invention may be appropriately used in, for example, a method of mass-producing a protection glass of a display element.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
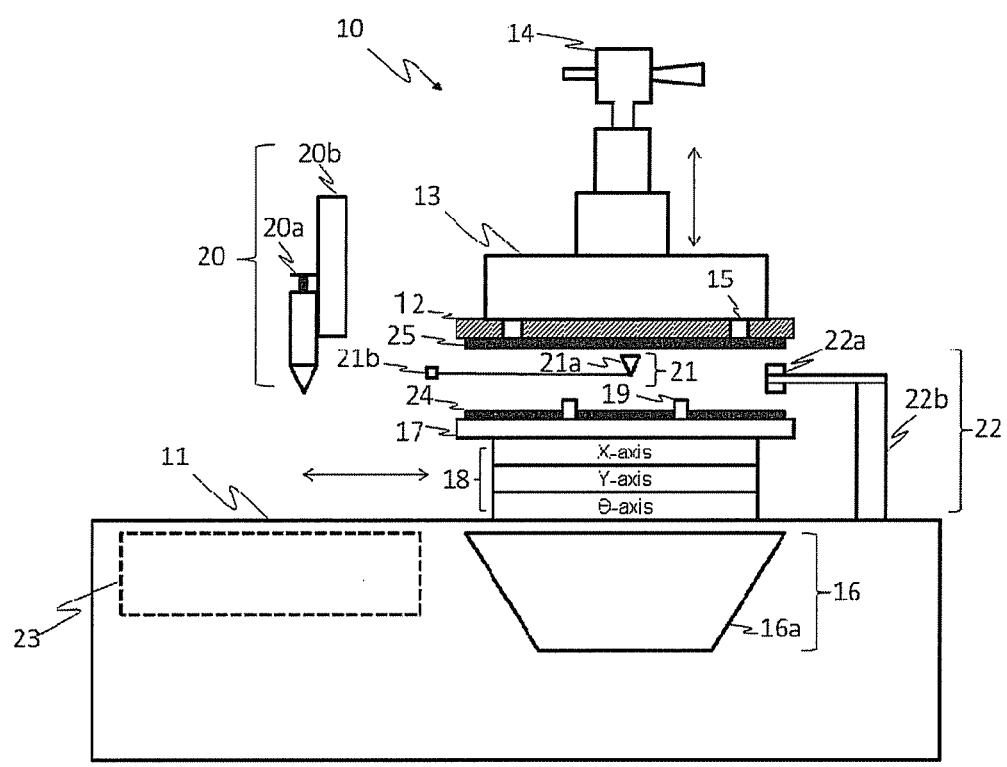
FIG. 1 is a schematic diagram illustrating a first example of a translucent rigid substrate bonding apparatus that can be used in an embodiment of the present invention.

Reference will now be made in detail to the present embodiments of the present invitation, examples of which are illustrated in the accompanying drawings, wherein like reference numerals refer to the like elements throughout. The embodiments are described below in order to explain the present invention by referring to the figures.

<First Embodiment>

In a first embodiment of a method of manufacturing a translucent rigid substrate laminate according to the present invention, the following processes are performed:

1) a process of preparing a first translucent rigid substrate, 2) a process of preparing a second translucent rigid substrate, 3) a process of applying a photo-curable fixing agent to a first surface of the first translucent rigid substrate and/or a first surface of the second translucent rigid substrate, 4) a process of allowing the first surface of the first translucent rigid substrate and the first surface of the second translucent rigid substrate to face each other so that both surfaces are parallel to each other under a predetermined positional relationship in a surface direction, 5) a process of applying a given pressure to the first surface of the first translucent rigid substrate and the first surface of the second translucent rigid substrate while maintaining the positional relationship, and bonding both translucent rigid substrates, 6) a process of irradiating light for curing the entire fixing agent interposed and spreading between both translucent rigid substrates while maintaining the given pressure to form the translucent rigid substrate laminate, and 7) a process of repeating processes 1) to 6) at least one time by regarding the translucent rigid substrate laminate as the first translucent rigid substrate to form the translucent rigid substrate laminate where at least three translucent rigid substrates are bonded.

In processes (1) and (2), the translucent rigid substrate that is a target to be processed is prepared. The translucent rigid substrate is not particularly limited, but examples thereof may include a plate glass (a material plate glass, a transparent conductive film-attached glass substrate, a glass substrate on which an electrode or a circuit is formed and the like), a sapphire substrate, a quartz substrate, a plastic substrate, a magnesium fluoride substrate and the like. Examples of glass may include reinforced glass. The size of the translucent rigid substrate is not particularly limited, but the translucent rigid substrate typically has an area of about 10,000 to 250,000 mm$^2$ and a thickness of about 0.1 to 2 mm. Generally, the translucent rigid substrates each have the same size. A given printing pattern or plating pattern for exhibiting any one of the functions of the plate-shaped product may be attached to the surface of the translucent rigid substrate, but is not limited. Examples of the printing pattern may include a design of a display screen of a mobile phone, and examples of the plating pattern may include a rotary encoder where a chrome plating pattern is formed.

In process (3), a photo-curable fixing agent is applied to the first surface of the first translucent rigid substrate arid/or the first surface of the second translucent rigid substrate. The photo-curable fixing agent is a fixing agent that is cured by irradiating light such as UV and softened by heating at high temperatures, and various kinds of fixing agents are known. Any known photo-curable fixing agents may be used in the present invention, and the photo-curable fixing agent is not particularly limited. The photo-curable fixing agent may be applied to a bonding surface of the translucent rigid substrate of any one side, and is preferably applied to the bonding surfaces of both translucent rigid substrates in view of improvement in adhesion property.

Examples of the photo-curable fixing agent appropriately used in the present invention may include, as described in WO 2008/018252, an adhesive composition including (A) polyfunctional (meth) acrylate, (B) monofunctional (meth) acrylate and (C) a photopolymerization initiator.

As (A) polyfunctional (meth) acrylate, polyfunctional (meth) acrylate oligomer/polymers having two or more (meth) acryloyl groups at an end or side chain of the oligomer/polymer, and polyfunctional (meth) acrylate monomers having two or more (meth) acryloyl groups may be used. Examples of the polyfunctional (meth) acrylate oligomer/polymer may include 1,2-polybutadiene terminated urethane (meth) acrylate (for example, "TE-2000" and "TEA-1000" manufactured by Nippon Soda Co., Ltd.), a hydrogenated product thereof (for example, "TEAM 000" manufactured by Nippon Soda Co., Ltd.), 1,4-polybutadiene terminated urethane (meth) acrylate (for example, "BAC-45" manufactured by Osaka Organic Chemical Industry Ltd.), polyisoprene terminated (meth) acrylate and polyester-based urethane (meth) acrylate (for example, "UV-2000B", "UV-3000B" and "UV-7000B" manufactured by The Nippon Synthetic Chemical Industry Co., Ltd., and "KHP-11" and "KHP-17" manufactured by Negami Chemical Industrial, Co., Ltd.), polyether-based urethane (meth) acrylate (for example, "UV-3700B" and "UV-6100B" manufactured by The Nippon Synthetic Chemical Industry Co., Ltd.), bisphenol A type epoxy (meth) acrylate or the like.

Examples of the bifunctional (meth) acrylate monomer may include 1,3-butylene glycol di(meth) acrylate, 1,4-butandiol
di(meth) acrylate, 1,6-hexanediol
di(meth)acrylate, 1,9-nonanediol
di(meth) acrylate, neopentylglycol
di(meth) acrylate, dicyclopentanyl
di(meth) acrylate, 2-ethyl-2-butyl-propandiol
di(meth) acrylate, neopentyl glycol-modified trimethylolpropane di (meth) acrylate,
stearic acid-modified pentaerythritol
(meth) acrylate, polypropylene glycol
(meth) acrylate,
2,2-bis(4-(meth) acryloxydiethoxyphenyl) propane,
2,2-bis(4-(meth) acryloxypropoxyphenyl)propane,
2,2-bis(4-(meth) acryloxytetraethoxyphenyl) propane or the like. Examples of the trifunctional (meth) acrylate monomer may include trimethylolpropane tri(meth) acrylate, tris[(meth)acryloxyethyl] isocyanurate and the like. Examples of tetrafunctional or more (meth) acrylate monomer may include dimethylolpropane tetra (meth) acrylate, pentaerythritol tetra (meth) acrylate, pentaerythritolethoxy tetra (meth) acrylate, dipentaerythritol penta (meth) acrylate, dipentaerythritol hexa(metha) acrylate or the like.

Examples of (B) the monofunctional (meth) acrylate monomer may include methyl (meth) acrylate, ethyl (meth) acrylate, propyl (meth) acrylate, butyl (meth) acrylate, 2-ethyl hexyl (meth) acrylate, isooctyl (meth) acrylate, isodecyl (meth) acrylate, lauryl (meth) acrylate, stearyl (meth) acrylate, phenyl (meth) acrylate, cyclohexyl (meth) acrylate, dicyclopentenyl (meth) acrylate, dicyclopentanyl (meth) acrylate, dicyclopentenyloxyethyl (meth) acrylate, isobornyl (meth) acrylate, methoxylated cyclodecatriene (meth) acrylate, 2-hydroxyethyl (meth) acrylate, 2-hydroxypropyl (meth) acrylate, 3-hydroxypropyl (meth) acrylate, 4-hydroxybutyl (meth) acrylate, tetrahydrofurfuryl (meth) acrylate, 2-hydroxy-3-phenoxypropyl (meth) acrylate, glycidyl (meth) acrylate, caprolacton-modified tetrahydrofurfuryl (meth) acrylate, 3-chloro-2-hydroxypropyl (meth) acrylate, N,N-dimethylaminoethyl (meth) acrylate, N,N-diethylaminoethyl (meth) acrylate, t-butylaminoethyl (meth) acrylate, ethoxycarbonylmethyl (meth) acrylate, phenolethylene oxide-modified (meth) acrylate, phenol 2 mol (ethylene oxide-modified) (meth) acrylate, phenol 4 mol (ethylene oxide-modified) (meth) acrylate, paracumylphenolethylene oxide-modified (meth) acrylate, nonylphenolethylene oxide-modified (meth) acrylate, nonylphenol 4 mol (ethylene oxide-modified) (meth) acrylate, nonylphenol 8 mol (ethylene oxide-modified) (meth) acrylate, nonylphenol 2.5 mol (propylene oxide-modified) (meth) acrylate, 2-ethylhexylcarbitol (meth) acrylate, ethylene oxide-modified phthalic acid (meth) acrylate, ethylene oxide-modified succinic acid (meth) acrylate, trifluoroethyl (meth) acrylate, acrylic acid, methacrylic acid, maleic acid, fumaric acid, ω-carboxy-polycaprolacton mono(meth) acrylate, phthalic acid monohydroxyethyl (meth) acrylate, (meth) acrylic acid dimer, β-(meth) acryloyloxyethyl hydrogen succinate, n-(meth) acryloyl oxyalkylhexahydrophthalimide, 2-(1,2-cyclohexacarboxyimide)ethyl (meth) acrylate, ethoxydiethyleneglycol (meth) acrylate, benzyl (meth) acrylate and the like.

A mixing ratio of (A) polyfunctional (meth) acrylate and (B) monofunctional (meth) acrylate is preferably (A):(B)=5:95 to 95:5 (parts by mass). If the ratio is 5 parts by mass or more, there is no worry of a reduction in initial adhesion property, and if the ratio is 95 parts by mass or less, a delaminating property may be ensured. The cured fixing agent is delaminated in a film form by being immersed in warm water. The content of (B) monofunctional (meth) acrylate is more preferably 40 to 80 parts by mass based on 100 parts by mass of the total content of (A) and (B).

(C) the photopolymerization initiator is mixed to promote photocuring of the resin composition by being sensitized by visible rays or active rays of UV, and various kinds of known photopolymerization initiators may be used. Specific examples thereof may include benzophenon or a derivative thereof; benzyl or a derivative thereof; anthraquinone or a derivative thereof; benzoin; a benzoin derivative such as benzoinmethylether, benzoinethylether, benzoinpropylether, benzoinisobutylether and benzyldimethylketal; an acetophenon derivative such as diethoxy acetophenon and 4-t-butyltrichloroacetophenon; 2-dimethylaminoethylbenzoate; p-dimethylaminoethylbenzoate; diphenyl disulfide; thioxanthone or a derivative thereof; camphorquinone; a camphorquinone derivative such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromoethylester, 7,7-dimethyl-2,3-dioxobicyclo[2.2.1]heptane-1-carboxy-2-methylester and 7,7-dimethyl-2,3-dioxobicyclo[2.2.1]heptane-1-carboxylic acid chloride; a α-aminoalkylphenon derivative such as 2-methyl-1-[4-(methylthio)phenyl]-2-morpholinopropan-1-on and 2-benzyl-2-dimethyl amino-1-(4-morpholinophenyl)-butanone-1; an acylphosphine oxide derivative such as benzoyldiphenylphosphine oxide, 2,4,6-trimethylbenzoyldiphenylphosphine oxide, benzoyldiethoxyphosphine oxide, 2,4,6-trimethyl benzoyl dimethoxyphenylphosphine oxide and 2,4,6-trimethyl benzoyl diethoxyphenylphosphine oxide; oxy-phenyl-acetic acid 2-[2-oxo-2-phenyl-acetoxy-ethoxy]-ethyl ester and/or oxy-phenyl-acetic acid 2-[2-hydroxy-ethoxy]-ethyl ester. The photopolymerization initiator may be used alone or in combination of two or more kinds thereof. Among the initiators, in view of a large effect, it is preferable to use one or two or more kinds of the group consisting of 1 benzyldimethylketal, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

The content of (C) the photopolymerization initiator is preferably 0.1 to 20 parts by mass and more preferably 0.5 to 10 parts by mass based on 100 parts by mass of the total content of (A) and (B). If the content is 0.1 parts by mass or more, a curing promotion effect may be definitely obtained, and if the content is 20 parts by mass or less, a sufficient curing speed may be obtained. Addition of component (C) in a content of 1 part by mass or more is more preferable in that curing can be performed irrespective of the amount of irradiation of light, and the degree of crosslinking of a cured body of the composition is increased, suppressing misalignment and the like during cutting processing and to improving a delaminating property.

It is preferable that the photo-curable fixing agent include the granular material (D) that is not dissolved in components (A), (B) and (C) of the fixing agent. Therefore, since the composition after curing can be maintained in a constant thickness, a process precision is improved. Further, line expansion coefficients of the cured body of the adhesive composition and the granular material (D) are different from each other, such that a delaminating property is improved when delaminating is performed after the translucent rigid substrate is bonded by using the adhesive composition.

Any one of generally used organic particles or inorganic particles may be used as the material of the granular material (D). Specifically, examples of the organic particles may include polyethylene particles, polypropylene particles, crosslinked polymethylmethacrylate particles, crosslinked polystyrene particles and the like. Examples of the inorganic particles may include ceramic particles such as glass, silica, alumina and titanium.

It is preferable that the granular material (D) have a sphere shape in view of improvement of processing precision, that is, control of the film thickness of the adhesive. It is preferable that an average particle size of the granular material (D) by a laser method be in the range of 20 to 200 μm. If the average particle size of the granular material is less than 20 μm, a delaminating property is poor, and if the average particle size is 200 μm or more, dislocation easily occurs when a provisionally fixed member is processed and a dimension precision is poor. In view of the delaminating property and the dimension precision, the average particle size (D50) is preferably 35 to 150 μm and more preferably 50 to 120 μm. A particle size distribution is measured by a laser diffraction type particle size distribution measurement device.

The use amount of the granular material (D), in view of adhesion property, processing precision and delaminating property, is preferably 0.1 to 20 parts by mass, more preferably 0.2 to 10 parts by mass, and most preferably 0.2 to 6 parts by mass based on 100 parts by mass of the total amount of (A) and (B).

A polymerization inhibitor (E) may be added to the photo-curable fixing agent in order to improve storage stability. Examples of the polymerization inhibitor may include methylhydroquinone, hydroquinone, 2,2-methylene-bis(4-methyl-6-tertiarybutylphenol, catechol, hydroquinonemonomethylether, monotertiarybutylhydroquinone, 2,5-ditertiarybutylhydroquinone, p-benzoquinone, 2,5-diphenyl-p-benzoquinone, 2,5-ditetiarybutyl-p-benzoquinone, picric acid, citric acid, phenothiazine, tertiarybutylcatechol, 2-butyl-4-hydroxyanisole, 2,6-ditertiarybutyl-p-cresol and the like.

The use amount of the polymerization inhibitor (E) is preferably 0.001 to 3 parts by mass and more preferably 0.01 to 2 parts by mass based on 100 parts by mass of the total amount of (A) and (B). If the use amount is 0.001 parts by mass or more, storage stability is ensured, and if the use amount is 3 parts by mass or less, a favorable adhesion property is obtained and uncuring does not occur.

In process (4), the first surface of the first translucent rigid substrate and the first surface of the second translucent rigid substrate face each other so that both surfaces are parallel to each other under a predetermined positional relationship in a surface direction. Generally, both translucent rigid substrates face each other in the surface direction so as to precisely overlap each other. A guide rail or frame for moving the translucent rigid substrate to a certain position by restricting a movement direction of the translucent rigid substrate may be considered as means for implementing the facing. In the case where position determination having a higher precision is required, it is preferable to perform the position determination by a bonding apparatus having a position determination mechanism. It is more preferable to attach a mark for alignment to the surface of the translucent rigid substrate and to use a bonding apparatus that can perform position adjustment while imaging the mark by an imaging device in order to perform position determination with a high precision. If misalignment is amended after both translucent rigid substrates are bonded, the fixing agent may leak from a bonding surface or scratches may be formed on the surface of the substrate, and thus, it is preferable to amend misalignment before bonding.

In process (5), bonding is performed so that the fixing agent spreads on the bonding surface by applying a given pressure to the first surface of the first translucent rigid substrate and the first surface of the second translucent rigid substrate while maintaining the positional relationship determined in process (4). In view of the lamination precision, it is preferable that the fixing agent spread in a constant thickness on the entire bonding surface.

If the amount of the applied fixing agent is excessively small, the fixing agent does not spread on the entire bonding surface, thus causing generation of bubbles on the bonding surface. If the bubbles are generated, a positional precision is reduced. If the amount of the applied fixing agent is excessively large, the fixing agent leaks from a gap of the bonding surface. Even if the fixing agent slightly leaks, the fixing agent may be wiped and leakage is not a big problem, but if the leakage amount is large, the fixing agent becomes useless.

Pressure during bonding is concerned with spread of the fixing agent. Accordingly, it is preferable to appropriately adjust the amount of the fixing agent and the bonding pressure. A method of using a bonding apparatus having a function of controlling pressure when the translucent rigid substrates are bonded to each other may be considered as means for implementing the adjustment. Pressure during bonding may be appropriately set in consideration of the aforementioned matters, and, for example, may be 5 to 50 g/cm$^2$ and typically 10 to 30 g/cm$^2$.

Further, controlling of the thickness of the fixing agent may be considered. A method of using a bonding apparatus having a function of controlling a height of the translucent rigid substrate when the translucent rigid substrates are bonded to each other, in addition to the method of mixing the granular material with the fixing agent as described above may be considered as the method of controlling the thickness.

In the case where there is a waiting time until transition is performed from process (5) to process (6) or the case where process (6) is performed at a position that is apart from a performing position of process (5), it may be considered that the translucent rigid substrate is stored in a given storage place or moved to a irradiation device. In this case, it is preferable to prevent misalignment of the substrates during movement or leakage of the fixing agent during storage. Therefore, process (5') of forming a provisionally fastened translucent rigid substrate laminate by irradiating light having energy that is lower than energy of process 6) on the entire fixing agent or a portion of the fixing agent interposed and spreading between both translucent rigid substrates may be performed between processes 5) and 6). In process (5'), if the thickness of the fixing agent is controlled, pressure may or may not be applied.

Since energy of light required in provisional fastening is significantly small as compared to light required during process (6), energy is sufficiently obtained by a simple lighting device such as a black light or an LED lamp. Accordingly, it is possible to increase a lamination precision while considering safety of a worker. The purpose that misalignment of the bonded translucent rigid substrates does not easily occur is accomplished, and curing distortion of the fixing agent is suppressed by irradiating light having energy that is lower than that of process (6) on the entire fixing agent or a portion of the fixing agent prior to process (6). As a result, distortion of the substrate of the fixed portion may be suppressed.

A wavelength of light irradiated for the purpose of provisional fastening may be appropriately changed according to a property of the used fixing agent, but for example, microwaves, infrared rays, visible rays, UV, X-rays, γ-rays, electron beams and the like may be irradiated. Generally, irradiation light is UV because UV can be simply used and has relatively high energy. The before, in the present invention, light means electromagnetic waves (energy rays) including a wide wavelength region as well as visible rays.

Light irradiated for the purpose of provisional fastening may be irradiated in an amount required to provisionally fasten the translucent rigid substrates, and when the amount is measured by a cumulative illuminometer using a light receptor of 365 nm, the amount may be generally 1 to 500 mJ/cm$^2$, typically 3 to 300 mJ/cm$^2$, and more typically 5 to 200 mJ/cm$^2$. The irradiation time is generally 1 to 120 sec, typically 2 to 60 sec, and preferably 2.5 to 20 sec.

In process (6), the translucent rigid substrate laminate is formed by irradiating light that cures the entire fixing agent interposed and spreading between both translucent rigid substrates while applying given pressure. Both translucent rigid substrates may be strongly bonded to each other, misalignment when the translucent rigid substrates are laminated may be prevented, and distortion of the substrate of the corresponding portion may be suppressed by irradiating light on the entire fixing agent.

Pressure in process (6) may be appropriately set in consideration of the aforementioned matters, and, for example, may be 5 to 50 g/cm$^2$ and typically 10 to 30 g/cm$^2$.

A wavelength of irradiated light may be appropriately changed according to a property of the used fixing agent, but for example, microwaves, infrared rays, visible rays, UV, X-rays, γ-rays, electron beams and the like may be irradiated. Generally, irradiation light is UV because UV can be simply used and has relatively high energy. Therefore, in the present invention, light means electromagnetic waves (energy rays) including a wide wavelength region as well as visible rays.

The irradiation amount of irradiated light is generally 30 to 4,000 mJ/cm$^2$, typically 100 to 3,000 mJ/cm$^2$, more typically 300 to 2,500 mJ/cm$^2$, and preferably 1,000 to 2,000 mJ/cm$^2$ when the amount is measured by the cumulative illuminometer using the light receptor of 365 nm. The irradiation time is generally 0.1 to 120 sec, typically 1 to 30 sec, and more typically about 10 to 20 sec. It is possible to control the thickness of the fixing agent and increase the lamination precision of the translucent rigid substrate by suppressing distortion of curing by performing irradiation of light while the bonding pressure is maintained.

In process (7), processes 1) to 6) are repeated at least one time by regarding the translucent rigid substrate laminate obtained in process (6) as the first translucent rigid substrate. Accordingly, the translucent rigid substrate laminate where at least three translucent rigid substrates are bonded is obtained. In view of an improvement in production efficiency of the plate-shaped product, it is preferable to manufacture the translucent rigid substrate laminate where 10 or more translucent rigid substrates and typically 10 to 30 translucent rigid substrates are laminated.

Since irradiated light is absorbed on the fixing agent, if the lamination number is increased, it is difficult to cure the fixing agent on the layer that is spaced apart from an irradiation source. Further, if the irradiation direction of light is randomly determined, an irradiation history of light received on the fixing agent in the translucent rigid substrate laminate is scattered, and the degree of curing of the fixing agent between the layers or on the same layer is changed. This is because the fixing agent is cured by irradiation of light but the fixing agent is softened as the amount of irradiation of light is increased. In this case, the translucent rigid substrates may not be laminated in a constant thickness and may be laminated in a distortion state due to a difference in curing distortion.

Accordingly, it is preferable to uniformalize irradiation history of light to the fixing agent existing between the layers of the translucent rigid substrate laminate. Examples of a method of reducing nonuniformity include a method of always irradiating light on a side of a newly bonded translucent rigid substrate. In other words, in process (6), light is irradiated on the surface of the second translucent rigid substrate. Process (6) includes process (6) repeated by process (7).

It is possible to further reduce nonuniformity by adjusting the intensity of irradiated light. For example, it is considered that the relationship between the intensity of light to be irradiated and the thickness of the fixing agent is set so that light does not pass through a new bonding surface on which an uncured fixing agent exists. For specific conditions, when measured by the cumulative illuminometer using the light receptor of 365 nm, the intensity of light is 100 mW/cm$^2$ or less, 10 to 100 mW/cm$^2$ in consideration of productivity, and preferably 50 to 100 mW/cm$^2$, and the thickness of the fixing agent is 75 μm or more, 75 to 120 μm in view of prevention of dimension dislocation while the translucent rigid substrate laminate is processed, and preferably 75 to 110 μm. Thus, since light is hardly further irradiated on the fixing agent that is present on the existing bonding surface, the fixing agents present on all bonding surfaces have substantially the same irradiation history.

<Manufacturing of the Plate-shaped Product>

The plate-shaped product may be manufactured from the translucent rigid substrate laminate obtained by the method of manufacturing the translucent rigid substrate laminate.

First, in process (8), the translucent rigid substrate laminate is divided in a thickness direction, and the divided translucent rigid substrate laminates are formed in a desired number. The division method is not particularly limited, but examples thereof may include a method of performing division in a rectangular parallelepiped form having the same size by using a disk cutter (diamond disk and cemented carbide disk), a fixed abrasive type or loose abrasive type wire saw, a laser beam, etching (for example: chemical etching or electrolytic etching using hydrofluoric acid, sulfuric acid or the like), and red heat zone (a nichrome wire) alone or in combination thereof. The etching may be used in surface treatment of a cut surface after the division.

Next, in process (9), desired shape processing is performed on each of the divided translucent rigid substrate laminates. In this process, since each of the divided translucent rigid substrate laminates may be integrally processed in a form of desired plate-shaped product, there is an advantage in that a production speed of the plate-shaped product may be significantly increased. The shape processing may be performed by any known means, and examples thereof may include grinding by a rotation whetstone, holing by an ultrasonic wave vibration drill, edge face processing by a rotation brush, holing by etching, edge face processing by etching, external shape processing by etching, flame processing using a burner and the like. The processing method may be used alone or in combination. The etching may be used in surface treatment after the shape processing.

In process (10), the bonded translucent rigid substrates are delaminated, and a plurality of plate-shaped products are formed by heating the translucent rigid substrate laminate after the shape processing. The heating method is not particularly limited, but since the fixing agent is softened in a film form and smoothly separated from each plate-shaped product, a method of immersing the translucent rigid substrate laminate after the shape processing in warm water is preferable. The appropriate temperature of warm water depends on the adopted fixing agent, but generally about 60 to 95° C. and preferably 80 to 90° C.

Figure 14:
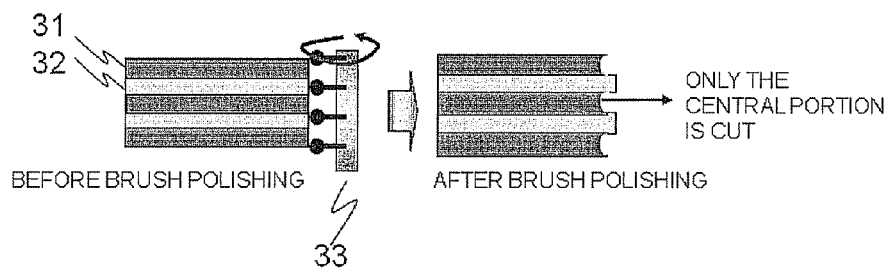
FIG. 14 is a schematic diagram illustrating a state where when an edge face of the substrate laminate is processed, the fixing agent acts as an obstacle, such that the substrate is not subjected to chamfering.

Herein, the edge face of the translucent rigid substrate laminate divided by process (8) has a flat surface by the translucent rigid substrate 31 and the fixing agent 32. If the edge face is processed by a rotation brush 33 and the like, an angulated portion of each translucent rigid substrate is not subjected to chamfering but on the contrary to this, the central portion is excessively cut because the fixing agent acts as an obstacle (FIG. 14), such that impact resistance of the translucent rigid substrate becomes insufficient. Accordingly, it is preferable that adhesion strength of an edge of an external side of the fixing agent exposed to the edge face of the divided translucent rigid substrate laminate be weak so that each translucent rigid substrate is subjected to chamfering while the edge face is processed.

Figure 15:
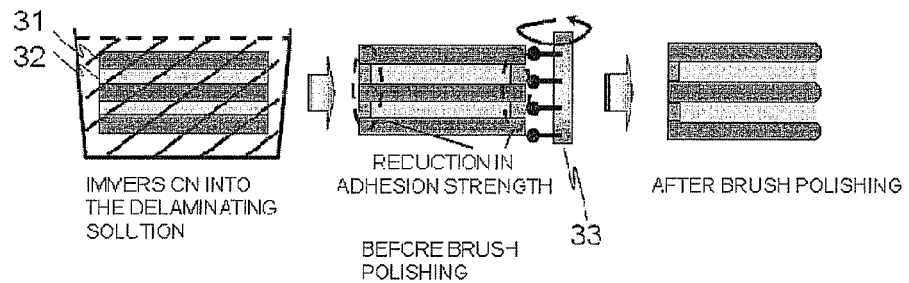
FIG. 15 is a schematic diagram illustrating a state where when the edge face of the substrate laminate is processed, each substrate is subjected to chamfering by reducing adhesion strength of an exposed portion of an edge of an external side of the fixing agent.

Specific examples of the method may include a method of bringing the divided translucent rigid substrate laminates into contact with a delaminating agent under temperature and time conditions required to reduce adhesion strength of an exposed portion of an edge of an external side of the fixing agent interposed between the translucent rigid substrates between processes (8) and (9) (for example: immersion, spraying, coating and the like) (FIG. 15).

The adhesion strength needs to be reduced in a very small region that is about 1 mm or less inward apart from the edge of the external side, and it is required that the temperature and the time are controlled so as not to reduce the adhesion strength of the entire surface of the bonding surface. The liquid temperature, depending on the delaminating agent used, is generally 50° C. or less and typically 20 to 40° C. The contact time is generally 30 min or less and typically 1 to 20 min. If the liquid temperature of the delaminating agent is excessively increased or the contact time is excessively long, the adhesion strength is easily reduced inside the bonding surface, which should be noticed.

The delaminating agent is not particularly limited as long as the delaminating agent is a liquid reducing adhesion strength of the fixing agent, may be appropriately selected according to a property of the fixing agent used, and generally includes one kind or two kinds or more selected from a solvent, an oxidizing agent, and a surfactant.

In the case where the solvent and/or the surfactant are used as the delaminating agent, since the fixing agent coming into contact with the delaminating agent swells to cause distortion at an interface with the substrate, adhesion strength is reduced. Preferably, the swollen fixing agent is cut (incised) by a physical means such as a cutter, and then dried. Accordingly, since the swollen fixing agent shrinks, it is easier to perform edge face processing by a brush and the like. In the case where the oxidizing agent is used as the delaminating agent, the adhesion strength is reduced by carbonizing the fixing agent to cause embrittling. Accordingly, the adhesion strength may be synergistically reduced by using the solvent and/or surfactant together with the oxidizing agent.

The solvent may be any of the inorganic solvent and the organic solvent, and examples thereof may include water, hydrofluoric acid, hydrochloric acid, alcohols (for example: methanol, ethanol, n-propanol, isopropanol, butanol, and benzyl alcohol), esters (for example: ethyl acetate, butyl acetate, normalpropyl acetate, ethyl lactate, dimethyl phthalate, and dimethyl adipate), ketones (for example: methylethylketone (MEK), methylisobutylketone (MIBK), and acetone), chlorine-based solvent (for example: methylene chloride, trichloroethylene, tetrachloroethylene), fluorine-based solvent (for example: hydrochlorofluorocarbon (HCFC), hydrofluorocarbon (HFC), glycolethers (for example: ethyleneglycolmonomethylether (methylcello), ethyleneglycolmonoethylether (ethylcello), ethyleneglycolmonobutylether (butylcello), butylcarbitol (butycarbi), ethyleneglycolmono-t-butyl ether (ETB), propyleneglycolmonomethylether (PGME), propyleneglycolmonomethylether acetate (PGMEA), 3-methoxy-3-methyl-1-butanol (MMB)), amine-based solvent (for example: N-methyl-2-pyrrolidone (NMP), dimethylformamide (DMF), and N,N-dimethylacetamide (DMAC)), ethers (for example: ethylethoxy propionate (EEP) and tetrahydrofuran (THF)), and dimethyl sulfoxide (DMSO).

In the solvent, alcohol may be typically used and benzyl alcohol may be preferably used.

Examples of the oxidizing agent may include sulfuric acid, nitric acid, hydrogen peroxide, ammonium persulfate, acyl peroxide, benzoyl peroxide, tert-butyl peroxide, hydroperoxide, ozone water, perchloric acid, hypochlorous acid and the like.

Any one of an anionic surfactant, a cationic surfactant, an ampholytic surfactant, and a nonionic surfactant may be used as the surfactant.

Examples of the anionic surfactant may include a carboxylic acid type (for example: fatty acid salts, polyoxyethylene alkyl ether carboxylate, N-acylsarcosinate, N-acylglutaminate), a sulfuric ester type (for example: alkyl sulfate, polyoxyethylenealkylether sulfate, alcoholethoxy sulfate, sulfate oil and fat), a sulfonic acid type (for example: alkylbenzene sulfonate, alkane sulfonate, alpha-olefine sulfonate, dialkylsulfo succinic acid, naphthalene sulfonate-formaldehyde condensate, alkyl naphthalene sulfonate, N-methyl-N-acyl taurate), and a phosphoric ester type (for example: alkyl phosphate, polyoxyethylenealkylether phosphate, polyoxyethylenealkylphenylether phosphorate), and the like.

Examples of the cationic surfactant may include an amine salt type (for example: alkylamine acetate), and a quaternary ammonium salt type (for example: monoalkylammonium, dialkylammonium, and ethoxylated ammonium).

Examples of the ampholytic surfactant may include a betaine type (for example: alkyldimethylaminoacetic acid betaine, alkylamidepropylbetaine, alkylhydroxysulfobetaine, and alkylhydroxysulfobetaine), alkyldimethylamine oxide and the like.

Examples of the nonionic surfactant may include an ester type (for example: glycerin fatty acid ester, propylene glycol fatty acid ester, sorbitan fatty acid ester, and sucrose fatty acid ester), an ether type (for example: polyoxyethylenealkylether, polyoxyethylenealkylphenylether, and polyoxyethylenepolyoxypropyleneether), an ether ester type (for example: polyoxyethylene sorbitan fatty acid ester and alkylglyceryl ether), an alkylalkanolamide type (fatty acid alkanol amide, fatty acid amidealkylene oxide adducts), and alkylpolyglycoside.

Among the surfactants, the anionic surfactant may be typically used, and the sulfonic acid type anionic surfactant may be preferably used.

It is preferable that the delaminating agent include one kind or two kinds or more selected from water, alcohols, an oxidizing agent and a surfactant in views of safety or environment, and it is more preferable that the delaminating agent include three kinds of water, alcohols, and the surfactant in view of safety. In this case, the delaminating agent preferably includes water, alcohols and the surfactant in a mass ratio of 30 to 50:30 to 50:5 to 20, and, for example, in a mass ratio of 30 to 40:40 to 50:10 to 20. The delaminating agent may be constituted by only these three kinds.

For example, the delaminating agent was manufactured by mixing water, benzyl alcohol and the sulfonic acid type anionic surfactant in a mass ratio of 35:50:15. Further, the plate glass laminate formed of twenty plate glasses was manufactured by using the fixing agent (I) mentioned in the Example to be described below as the fixing agent and using the method according to the present invention. The plate glass laminate was immersed in the delaminating agent at 35° C. for 5 min, and the edge face thereof was then processed by the rotation brush. The edge face after processing was observed by the microscope, and as a result, the angulated portion of each plate glass was subjected to chamfering to have a circle shape. Meanwhile, in the case where edge face processing was performed without immersing in the delaminating agent, the angulated portion of each plate glass was not subjected to chamfering.

Likewise, the plate glass laminate formed of twelve plate glasses was manufactured by using the method according to the present invention. The plate glass laminate was immersed in the delaminating agent at 35° C. for 5 min, and the edge face thereof was then processed by the rotation brush. The edge face after processing was observed by the microscope, and as a result, the angulated portion of each plate glass was subjected to chamfering to have a circle shape. Meanwhile, in the case where edge face processing was performed without immersing in the delaminating agent, the angulated portion of each plate glass was not subjected to chamfering.

<Constitution Example of the Apparatus>

An example of the translucent rigid substrate bonding apparatus according to the present invention will be described. The translucent rigid substrate bonding apparatus according to the present invention is used to simultaneously perform bonding of the substrates and adhesion. The translucent rigid substrate laminate formed of a plurality of translucent rigid substrates may be manufactured by further bonding the substrate to the translucent rigid substrate laminate obtained by using the present invention. The translucent rigid substrate laminate may be divided in a thickness direction, and the divided translucent rigid substrate laminates may be formed in a desired number. The desired shape processing is performed with respect to each of the divided translucent rigid substrate laminates, and the bonded translucent rigid substrates may be delaminated from each other and a plurality of plate-shaped products may be formed by heating the translucent rigid substrate laminate (for example: immersion in warm water) after the shape processing.

Each of the translucent rigid substrates may be one translucent rigid substrates to be bonded may be a laminate formed of two or more translucent rigid substrates. The laminate of the translucent rigid substrate may be a translucent rigid substrate laminate manufactured by the translucent rigid substrate bonding apparatus according to the present invention. Typically, it is intended that the translucent rigid substrate laminate where about ten to thirty translucent rigid substrates are laminated is manufactured by using the translucent rigid substrate bonding apparatus according to the present invention.

FIG. 1 is a schematic diagram illustrating a first example of a translucent rigid substrate bonding apparatus according to the present invention. A translucent rigid substrate bonding apparatus 10 comprises a rack 11, an upper stage 12, a press unit 13, an absorption unit 14, an absorption hole 15, a UV irradiation unit 16, a lower stage 17, a lower stage moving means 18, a side clamp 19, a coating unit for a lower substrate 20, a coating unit for an upper substrate 21, an imaging unit 22, and an electric component unit 23.

The rack 11 is a base portion on which constitution components of the translucent, rigid substrate bonding apparatus 10 are mounted, and the electric component unit 23 is disposed therein. The electric component unit 23 performs sequence control of the constitution components by a programmable logic controller (PLC).

Figure 2:
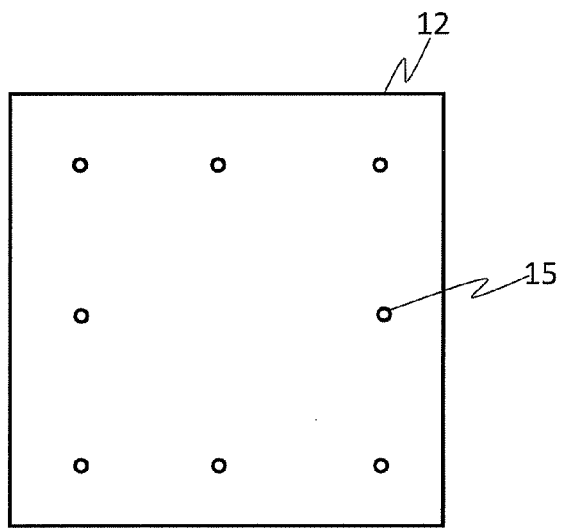
FIG. 2 is a schematic diagram illustrating an example of a lower surface of an upper stage.

The upper stage 12 holds a translucent rigid substrate 25 of the upper side by vacuum adsorption. Accordingly, a plurality of absorption holes 15 are formed in a lower surface of the upper stage 12, and the absorption holes 15 are connected to the absorption unit 14 through pipes. FIG. 2 is a schematic diagram of the lower surface of the upper stage 12, and illustrates a disposal example of the absorption holes 15. A vacuum pump, a vacuum ejector and the like may be used as the absorption unit 14.

The press unit 13 for bonding the substrates while pressing the translucent rigid substrate 25 of the upper side to the translucent rigid substrate 24 of the lower side is connected to the upper portion of the upper stage 12. The press unit 13 has an elevating cylinder (not shown) that can move the upper stage 12 in a Z direction (vertical direction), and may control pressing force, a moving speed, a pressing time and a height thereof by a servo motor.

The lower stage 17 holds the translucent rigid substrate 24 of the lower side and, at the same time, receives pressure from the upper stage 12 during pressing. The lower stage 17 is made of a UV-transmissive material, and examples of the material may include quartz glass, magnesium fluoride, calcium fluoride and transparent plastics such as a methacrylic resin. The lower stage 17 can be moved in an X-axis direction, a Y-axis direction and a θ-axis direction by the lower stage moving means 18. The lower stage moving means 18 is constituted by a θ table enabling slewing motion in a horizontal direction and an X table and a Y table enabling horizontal movement. The tables are driven by a motor. The side clamp 19 that is driven by the motor and can be moved in the X-axis direction and the Y-axis direction to determine the position of the mounted translucent rigid substrate is provided on the upper surface of the lower stage 17. The lower stage moving means 18 is disposed at a position at which a course of UV irradiated from the lower part thereof is not disturbed. A position determination stopper for mounting the translucent rigid substrate at a target position may be provided instead of the side clamp 19 on the upper surface of the lower stage 17. In this case, the translucent rigid substrate is manually loaded at a position at which the translucent rigid substrate is fixed by the stopper. Further, in order to prevent misalignment of the translucent rigid substrate, like the upper stage 12, the translucent rigid substrate 24 of the lower side may be held by vacuum adsorption.

The UV irradiation unit 16 for irradiating UV to the lower surface of the lower side translucent rigid substrate 24 in order to cure the fixing agent is installed below the lower stage 17. The UV irradiation unit 16 is provided with a reflection plate 16a for uniformly lighting the entire translucent rigid substrate 24 of the lower side held on the lower stage 17.

The UV irradiation unit 16 may be provided with a cooler for suppressing distortion of curing. Examples of the cooler may include a cold mirror, a cold filter and a cooling fan. The irradiation time of UV to the translucent rigid substrate is controlled by opening and closing a shutter. The irradiation amount of irradiated light required to cure the fixing agent is generally 30 to 4,000 mJ/cm$^2$, typically 100 to 3,000 mJ/cm$^2$, more typically 300 to 2,500 mJ/cm$^2$, and preferably 1,000 to 2,000 mJ/cm$^2$ when the amount is measured by the cumulative illuminometer using the light receptor of 365 nm. The irradiation time is generally 0.1 to 120 sec, typically 1 to 30 sec, and more typically about 10 to 20 sec.

Since the coating unit for the lower substrate 20 is provided with a dispenser 20a of the photo-curable fixing agent and a robot 20b that is connected thereto, can be moved in X-, Y- and Z-axis directions, and is driven by the motor, the fixing agent may be applied in a given pattern to the upper surface of the translucent rigid substrate 24 of the lower side. The fixing agent is filled in a syringe, and automatically and quantitatively discharged. The coating amount is controlled by a digital pressure meter and a coating speed.

The coating unit for the upper substrate 21 automatically applies the photo-curable fixing agent on the lower surface of the translucent rigid substrate 25 of the upper side while the translucent rigid substrate 25 of the upper side is held on the upper stage 12. The coating amount is controlled by a pressure gauge and a coating time. The coating unit for the upper substrate 21 is provided with a robot 21b that has a rotation shaft rotatable in a horizontal direction beside the upper and lower stages and is driven by a motor, a rotary nozzle 21a at an end thereof is disposed below around the center of the upper stage 12 during coating, and the fixing agent is applied from the tip of the nozzle 21a. If the coating is finished, the coating unit for the upper substrate 21 is stored beside the upper and lower stages so as not to disturb bonding of the translucent rigid substrate.

The imaging unit 22 images an alignment mark for position adjustment installed on each surface of the translucent rigid substrate 25 of the upper side and the translucent rigid substrate 24 of the lower side by digital cameras 22a attached to upper and lower two portions at an end of an arm. The electric component unit 23 detects a relative misalignment state of the translucent rigid substrate 25 of the upper side and the translucent rigid substrate 24 of the lower side based on the obtained image information. Operations of slightly adjusting the position of the lower stage 17 in the X-axis direction, the Y-axis direction and the θ-axis direction by the lower stage moving means 18 and amending the misalignment are performed based on the detection result. After the amendment of the misalignment, both translucent rigid substrates are bonded. An analogue camera may be used as the camera in addition to the digital camera using CCD or CMOS as the imaging element, but it is preferable to use the digital camera in view of high resolution.

The imaging unit 22 is provided with a moving means 22b driven by a motor in X- and Y-axis directions, and the digital camera 22a is moved to a target position at which the alignment mark is clearly viewed when imaging is performed. If the imaging is finished, the digital camera 22a is moved so as not to disturb the translucent rigid substrates from being bonded.

The procedure of bonding of the translucent rigid substrates using the translucent rigid substrate bonding apparatus 10 regarding the first example will be described with reference to FIGS. 3 to 13.

Figure 3:
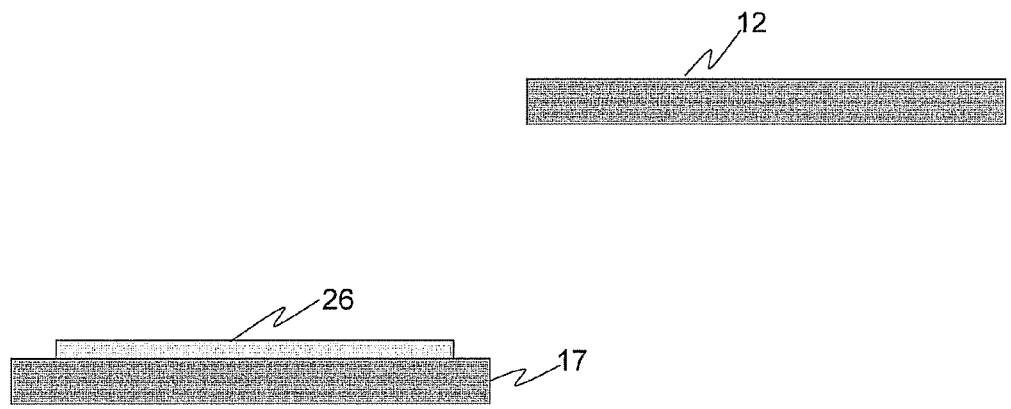
FIG. 3 is a view illustrating a state where a first substrate is mounted on a lower stage.
Figure 4:
FIG. 4 is a view illustrating a state where the first substrate mounted on the lower stage is conveyed directly below the upper stage.
Figure 4:
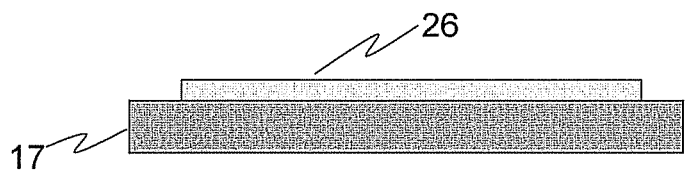
Figure 5:
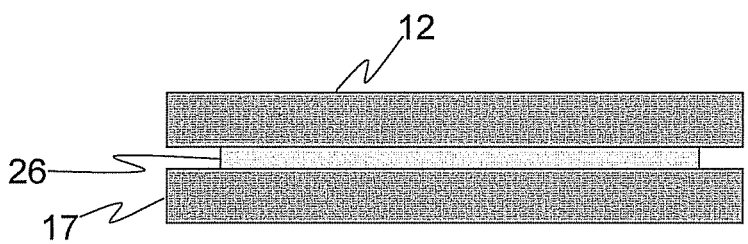
FIG. 5 is a view illustrating a state where the upper stage is lowered to vacuum-adsorb the first substrate.
Figure 6:
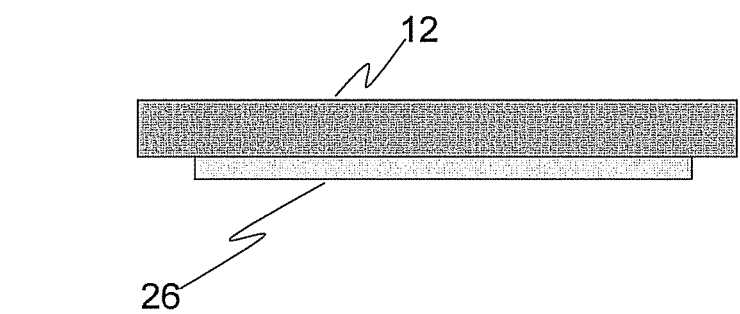
FIG. 6 is a view illustrating a state where the upper stage is raised while the adsorbed first substrate is held.
Figure 6:

First, the first translucent rigid substrate 26 is mounted on the lower stage 17, and fixed at a target position by the side clamp 19 (not shown) (FIG. 3). The loading of the translucent rigid substrate 26 on the lower stage 17 may be manually performed, but a plurality of translucent rigid substrates 26 may be housed in an exclusive cassette and automatically mounted on the lower stage 17. The mounted translucent rigid substrate 26 is moved directly below the upper stage 12 by the lower stage moving means 18 (not shown) (FIG. 4). Subsequently, the upper stage 12 is lowered by the press unit 13. The translucent rigid substrate 26 is vacuum-adsorbed by absorption force from the absorption holes 15 (not shown) (FIG. 5). The adsorbed translucent rigid substrate 26 is held and is raised together with the upper stage 12, and waits the second substrate (FIG. 6).

Figure 7:
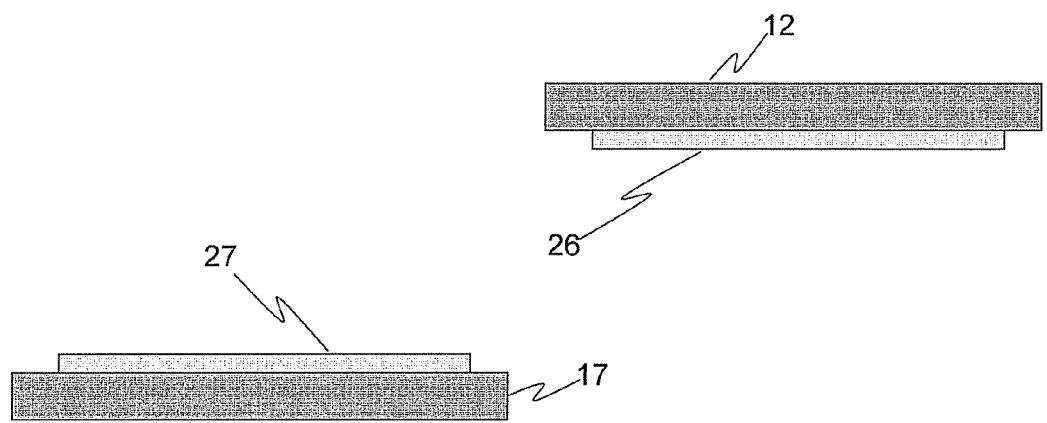
FIG. 7 is a view illustrating a state where a second substrate is mounted on the lower stage.
Figure 8:
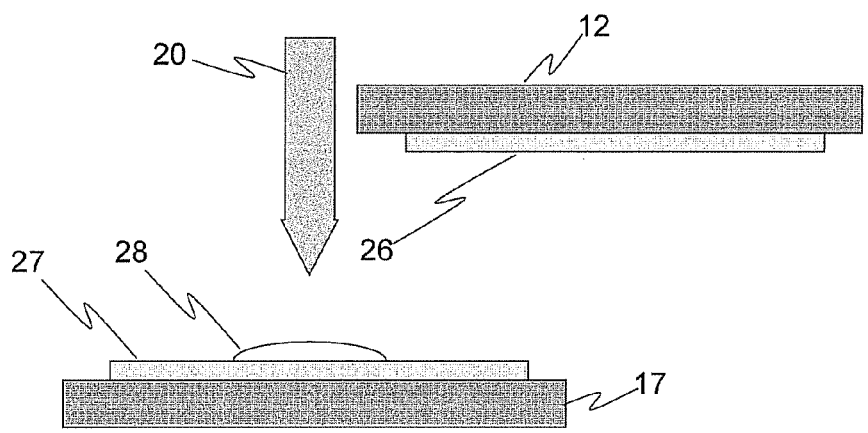
FIG. 8 is a view illustrating a state where a fixing agent is applied to an upper surface of the second substrate.
Figure 9:
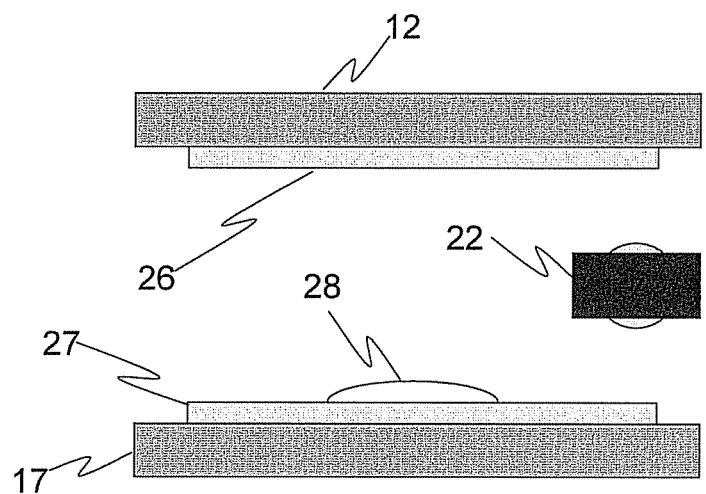
FIG. 9 is a view illustrating a state where the second substrate mounted on the lower stage is conveyed directly below the upper stage and an alignment mark attached to the surfaces of both the substrates is imaged by a camera.

Next, the second translucent rigid substrate 27 is mounted on the lower stage 17, and fixed at a target position by the side clamp 19 (not shown) (FIG. 7). The fixing agent 28 is applied in a given pattern from the coating unit for the lower substrate 20 to the upper surface of the second translucent rigid substrate 27 (FIG. 8). After the coating is completed, if the second translucent rigid substrate 27 mounted on the lower stage 17 is moved directly below the upper stage 12, the alignment mark is imaged by the camera attached to the end of the arm of the imaging unit 22, and the position of the lower stage 17 is slightly adjusted according to the imaging result for positional adjustment of both translucent rigid substrates 26 and 27 (FIG. 9).

Figure 10:
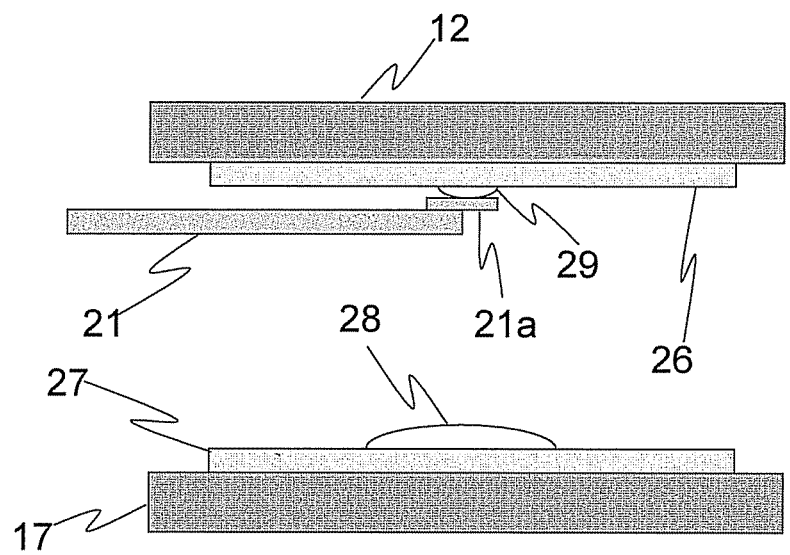
FIG. 10 is a view illustrating a state where the fixing agent is applied to the lower surface of the first substrate held on the upper stage.
Figure 11:
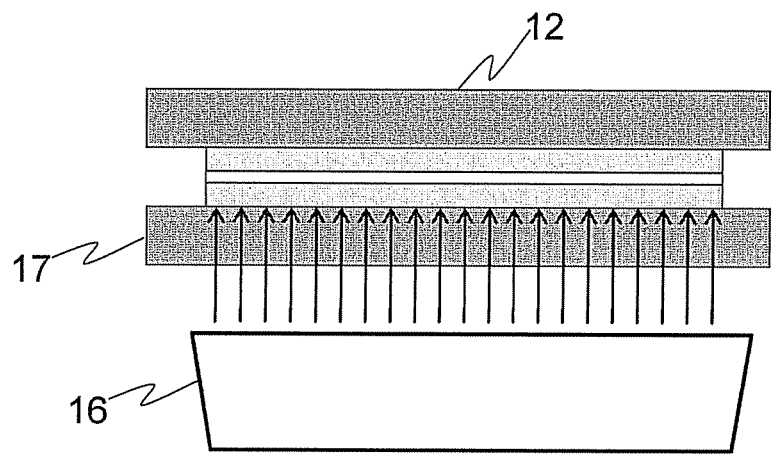
FIG. 11 is a view illustrating a state where the upper stage is lowered to bond two substrates and UV is irradiated from a lower side thereof.

After the positional adjustment, the nozzle 21a attached to the end of the arm of the coating unit for the upper substrate 21 is moved to around the center of the first substrate 26 held on the upper stage 12, and the fixing agent 29 is applied from the nozzle 21a to the lower surface of the first translucent rigid substrate 26 (FIG. 10). After the fixing agents 28 and 29 are applied to the translucent rigid substrates 26 and 27 of the upper side and the lower side, if the upper stage 12 is lowered by the press unit 13 and two translucent rigid substrates 26 and 27 are bonded by pressing, the fixing agents 28 and 29 interposed between the translucent rigid substrates of the upper side and the lower side spread on the entire surface of the translucent rigid substrate by pressing. While the pressing state is maintained, UV is irradiated from the UV irradiation unit 16 to the fixing agent (FIG. 11). Accordingly, the fixing agent is cured to adhere two translucent rigid substrates 26 and 27.

Figure 12:
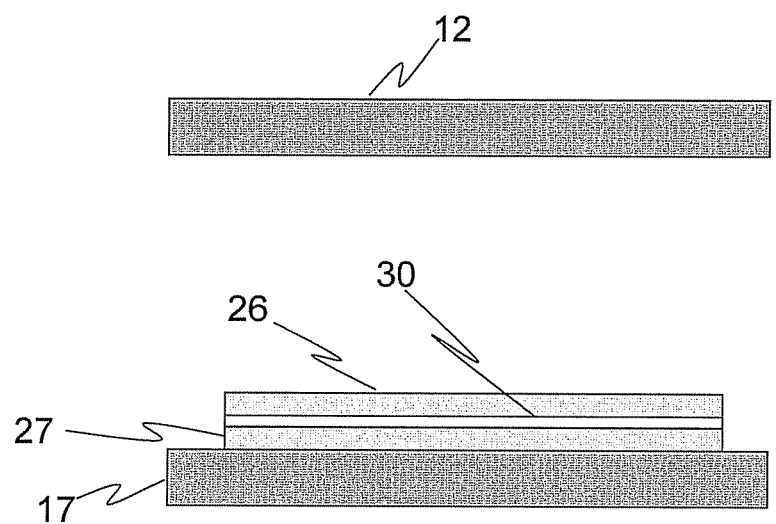
FIG. 12 is a view illustrating a state where the upper stage is raised after irradiation of UV.
Figure 13:
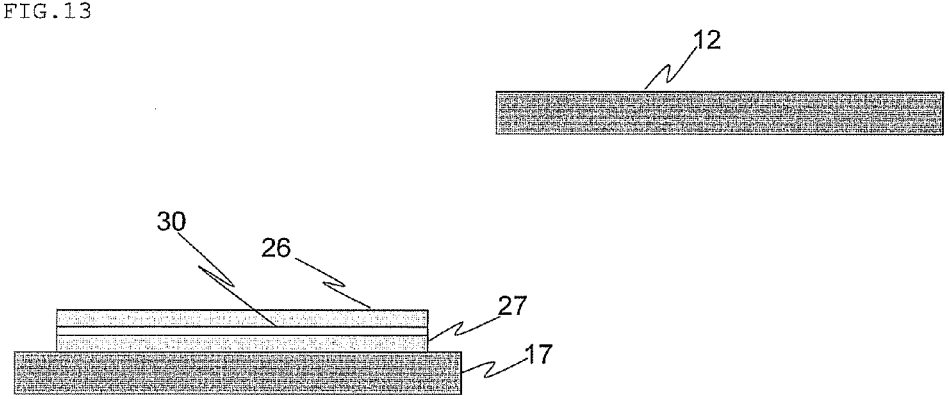
FIG. 13 is a view illustrating a state where the bonded substrates are conveyed back to the original position by the lower stage.

After UV is irradiated, adsorption to the substrate 26 of the upper side is removed, and only the upper stage 12 is raised (FIG. 12). The bonded translucent rigid substrates are conveyed back to the original position by the lower stage 17 (FIG. 13). The bonding of the translucent rigid substrates is completed by the aforementioned process.

EXAMPLE

As an example, according to the present invention, processes (1) to (10) (including process (5')) were performed under the following conditions by using the translucent rigid substrate bonding apparatus described with reference to FIG. 1, and the translucent rigid substrate laminate was delaminated, such that the fixing agent was softened in a film form and was smoothly separated in each plate-shaped product.

The following plate glass was used as the translucent rigid substrate. The plate glass attached with the plating patterns and each having the dimension of width of 530 mm length of 420 mm thickness of 0.7 mm was used. The photo-curable fixing agent (I) was manufactured by mixing the following components (A) to (E).

(A) As the polyfunctional (meth) acrylates, 20 parts by mass of "UV-3000B" manufactured by The Nippon Synthetic Chemical Industry Co., Ltd. (urethaneacrylate, hereinafter abbreviated as "UV-3000B") and 15 parts by mass of dicyclopentanyl diacrylate ("KAYARAD R-684" manufactured by Nippon Kayaku Co., Ltd., hereinafter abbreviated as "R-684"), (B) as the monofunctional (meth) acrylates, 50 parts by mass of 2-(1,2-cyclohexacarboxyimide)ethyl acrylate ("ARONIX M-140" manufactured by TOAGOSEI CO., LTD., hereinafter abbreviated as "M-140") and 15 parts by mass of phenol 2 mol ethylene oxide-modified acrylate ("ARONIX M-101A" manufactured by TOAGOSEI CO., LTD.), (C) as the photopolymerization initiator, 8 parts by mass of benzyldimethylketal ("IRGACURE651" manufactured by BASF Co., Ltd., hereinafter, abbreviated as "BDK"), (D) as the granular material, 1 part by mass of spherical crosslinked polystyrene particles with an average particle size 100 μm ("GS-100S" manufactured by GANZ CHEMICAL CO., LTD.), and (E) as the polymerization inhibitor, 0.1 parts by mass of 2,2-methylene-bis(4-methyl-6-tertiarybutylphenol) ("Sumilizer MDP-S" manufactured by Sumitomo Chemical Co., Ltd., hereinafter abbreviated as "MDP").

In process (3), 40 g of the fixing agent (I) was applied to each bonding surface of the plate glasses.

In process (5), pressure during bonding was 20 g/cm$^2$. In process (5'), when the photo-curable adhesive was cured by the UV irradiation unit 16, provisional fastening was performed by setting the UV irradiation amount to 160 mJ/cm$^2$ (measurement by the cumulative illuminometer by the light receptor of 365 nm), applying pressure of 20 g/cm$^2$, and setting the UV irradiation time to 2 sec. In process (6), when the photo-curable adhesive was cured while applying pressure of 20 g/cm$^2$, the UV irradiation amount was set to 2,000 mJ/cm$^2$ (measured by the cumulative illuminometer by the light receptor of 365 nm), and the UV irradiation time was set to 20 sec. In process (7), the plate glass laminate formed of twelve plate glasses was manufactured by using the fixing agent (I) as the fixing agent and using the method according to the present invention. In process (8), the disk cutter (diamond disk) was used and the laminate was divided into a rectangular parallelepiped form (width of 100 mm length of 55 mm thickness of 9.6 mm). In process (9), grinding by the rotation whetstone, holing by an ultrasonic wave vibration drill, and edge face processing by the rotation brush were sequentially performed for, shape processing. In process (10), the plate glass laminate was immersed in warm water at 85° C. to be delaminated.

Although the present invention has been described in connection with the embodiments with reference to the drawings, the present invention is not limited to the embodiments but various modifications and changes can be made thereto.

Reference Signs List
10 Translucent Rigid Substrate Bonding Apparatus
11 Rack
12 Upper Stage
13 Press Unit
14 Absorption Unit
15 Absorption Hole
16 UV Irradiation Unit
17 Lower Stage
18 Lower Stage Moving Means
19 Side Clamp
20 Coating Unit for Lower Substrate
21 Coating Unit for Upper Substrate 22 Imaging Unit
23 Electric Component Unit
24 Lower Substrate
25 Upper Substrate
31 Translucent Rigid Substrate
32 Fixing Agent
33 Rotation Brush Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of manufacturing a plate-shaped product, comprising:
   1) a process of preparing a first translucent rigid substrate,
   2) a process of preparing a second translucent rigid substrate,
   3) a process of applying a photo-curable fixing agent to a first surface of the first translucent rigid substrate and/or a first surface of the second translucent rigid substrate,
   4) a process of allowing the first surface of the first translucent rigid substrate and the first surface of the second translucent rigid substrate to face each other so that both surfaces are parallel to each other under a predetermined positional relationship in a surface direction,
   5) a process of applying a pressure of 5 to 50 g/cm$^2$ to the first surface of the first translucent rigid substrate and the first surface of the second translucent rigid substrate while maintaining the positional relationship to bond both translucent rigid substrates to each other,
   6) a process of irradiating light each time to the surface of the second translucent rigid substrate for curing the entire fixing agent interposed and spreading between both translucent rigid substrates while applying the pressure of 5 to 50 g/cm$^2$ to form a translucent rigid substrate laminate, wherein a relationship between an intensity of light to be irradiated in process 6) and a thickness of the fixing agent is set so that light does not substantially pass through a new bonding surface on which the fixing agent that is uncured exists,
   7) a process of repeating processes 1) to 6) at least one time by regarding the translucent rigid substrate laminate as the first translucent rigid substrate to form the translucent rigid substrate laminate where at least three translucent rigid substrates are bonded,
   8) a process of dividing the translucent rigid substrate laminate obtained in a thickness direction to form a desired number of the divided translucent rigid substrate laminates,
   9) a process of performing desired shape processing with respect to each of the divided translucent rigid substrate laminates, and
   10) a process of heating the divided translucent rigid substrate laminate after the shape processing to delaminate the bonded translucent rigid substrates from each other and forming a plurality of plate-shaped products.

2. The method of manufacturing a plate-shaped product according to claim 1, further comprising:
   a process of bringing the divided translucent rigid substrate laminates into contact with a delaminating agent under temperature and time conditions required to reduce adhesion strength of an exposed portion of an edge of an external side of a fixing agent interposed between the translucent rigid substrates between processes 8) and 9).

3. The method of manufacturing a plate-shaped product according to claim 2, wherein the delaminating agent includes an anionic surfactant.

4. The method of manufacturing a plate-shaped product according to claim 3, wherein the delaminating agent includes a sulfonic acid type surfactant.

5. The method of manufacturing a plate-shaped product according to claim 2, wherein the delaminating agent includes one kind or two kinds or more selected from a solvent, an oxidizing agent and a surfactant.

6. The method of manufacturing a plate-shaped product according to claim 2, wherein the delaminating agent includes one kind or two kinds or more selected from water, alcohols, an oxidizing agent and a surfactant.

7. The method of manufacturing a plate-shaped product according to claim 2, wherein the delaminating agent includes the water, the alcohols and the surfactant in a mass ratio of 30 to 50:30 to 50:5 to 20.

8. The method of manufacturing a plate-shaped product according to claim 2, wherein the delaminating agent includes benzyl alcohol.

9. The method of manufacturing a plate-shaped product according to claim 2, wherein a liquid temperature of the delaminating agent is 20 to 40° C. and a contact time to the delaminating agent is 1 to 20 min.

10. The method of manufacturing a plate-shaped product according to claim 1, wherein 5') a process of forming a provisionally fastened translucent rigid substrate laminate by irradiating light each time to the surface of the second translucent rigid substrate, the light having energy that is lower than energy of process 6) on the entire fixing agent or a portion of the fixing agent interposed and spreading between both translucent rigid substrates is performed between processes 5) and 6).

11. The method of manufacturing a plate-shaped product according to claim 1, wherein a mark for alignment is attached to the surface of each translucent rigid substrate, and process 4) includes performing position adjustment while imaging the mark by an imaging device.

12. The method of manufacturing a plate-shaped product according claim 1, wherein a given printing pattern and/or plating pattern for exhibiting any one of the functions of a translucent rigid substrate product is attached to the surface of each translucent rigid substrate.

13. The method of manufacturing a plate-shaped product according to claim 1, wherein the fixing agent includes a granular material.

14. The method of manufacturing a plate-shaped product according to claim 1, wherein the amount of irradiation of light in process 6) is in the range of 30 to 4,000 mJ/cm$^2$ when measured by a cumulative illuminometer using a light receptor of 365 nm.

15. The method of manufacturing a plate-shaped product according to claim 1, wherein the translucent rigid substrate is a plate glass.

16. The method of manufacturing a translucent rigid substrate laminate according to claim 1, wherein the intensity of light to be irradiated in process 6) is 10 to 100 mW/cm$^2$ when measured by a cumulative illuminometer using a light receptor of 365 nm.

* * * * *